(12) United States Patent
Tanase et al.

(10) Patent No.: US 11,252,944 B2
(45) Date of Patent: Feb. 22, 2022

(54) ARTIFICIAL LIGHTING SYSTEM FOR FISH AND A METHOD OF PROVIDING FISH LIGHTING

(71) Applicant: SIGNIFY HOLDING B.V., Eindhoven (NL)

(72) Inventors: Cristina Tanase, Waalre (NL); Rémy Cyrille Broersma, Eindhoven (NL); Henricus Marie Peeters, Baarlo (NL); René Theodorus Wegh, Veldhoven (NL); Rob Franciscus Maria Van Elmpt, Roermond (NL); Martinus Petrus Joseph Peeters, Weert (NL); Esther De Beer, Waalre (NL); Rainier Franciscus Xaverius Alphonsus Marie Mols, Venlo (NL); Ronaldus Johannes Marie Velings, Nederweert (NL); Patrick Henricus Johannes Van Stijn, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 894 days.

(21) Appl. No.: 15/103,345

(22) PCT Filed: Dec. 8, 2014

(86) PCT No.: PCT/EP2014/076941
§ 371 (c)(1),
(2) Date: Jun. 10, 2016

(87) PCT Pub. No.: WO2015/086542
PCT Pub. Date: Jun. 18, 2015

(65) Prior Publication Data
US 2016/0353716 A1    Dec. 8, 2016

(30) Foreign Application Priority Data
Dec. 10, 2013   (EP) ..................... 13196390

(51) Int. Cl.
*A01K 63/06* (2006.01)
*A01K 61/10* (2017.01)
(Continued)

(52) U.S. Cl.
CPC .............. *A01K 63/06* (2013.01); *A01K 61/10* (2017.01); *H05B 45/10* (2020.01); *H05B 45/20* (2020.01);
(Continued)

(58) Field of Classification Search
CPC ....... A01K 63/06; A01K 61/10; Y02A 40/812
See application file for complete search history.

(56) References Cited

U.S. PATENT DOCUMENTS 4,885,864 A    12/1989 Carner
7,878,674 B2    2/2011 Crabb et al.
(Continued)

FOREIGN PATENT DOCUMENTS

CN    101352101 A    1/2009
CN    102438373 A    5/2012
(Continued)

OTHER PUBLICATIONS

Boeuf, Gilles, et al., "Does Light Have an Influence on Fish Growth?" Aquaculture, 177 (1999), Elsevier Science B.V. (24 Pages).
(Continued)

*Primary Examiner* — Kristen C Hayes

(57) ABSTRACT

A fish lighting system has an input interface (10) which receives instructions corresponding to a desired fish behavioral and/or physiological response (12). This is converted into a lighting control signal (RGB, t) for driving a lighting arrangement (18), with the intensity and color of the output from the lighting arrangement selected to obtain the desired fish behavioral and/or physiological response.

6 Claims, 5 Drawing Sheets

(51) Int. Cl.
*H05B 45/10* (2020.01)
*H05B 45/20* (2020.01)
*H05B 47/11* (2020.01)
*H05B 47/105* (2020.01)

(52) U.S. Cl.
CPC .......... *H05B 47/105* (2020.01); *H05B 47/11* (2020.01); *Y02A 40/81* (2018.01)

(56) References Cited

U.S. PATENT DOCUMENTS

| | | | | |
|---|---|---|---|---|
| 2008/0316732 | A1* | 12/2008 | Blake | A01K 63/06 362/101 |
| 2012/0044713 | A1 | 2/2012 | Chiang et al. | |
| 2012/0326610 | A1* | 12/2012 | Lawyer | A01K 63/06 315/117 |
| 2013/0152864 | A1 | 6/2013 | Grajcar et al. | |
| 2013/0174792 | A1* | 7/2013 | Delabbio | A01K 63/06 119/200 |
| 2015/0163888 | A1* | 6/2015 | Fredricks | H05B 37/0272 119/51.04 |
| 2017/0000163 | A1* | 1/2017 | Grajcar | A23K 20/179 |
| 2017/0094756 | A1* | 3/2017 | Saffari | H05B 37/0272 |

FOREIGN PATENT DOCUMENTS

| | | |
|---|---|---|
| CN | 202535920 U | 11/2012 |
| CN | 202618022 U | 12/2012 |
| CN | 202697491 U | 1/2013 |
| JP | 2007259764 A | 10/2007 |
| JP | 2008187987 A | 8/2008 |
| KR | 20120083185 A | 7/2012 |
| WO | 2011019288 A2 | 2/2011 |

OTHER PUBLICATIONS

Kusmic, C., et al., "Morphology and Spectral Sensitivities of Retinal and Extraretinal Photoreceptors in Freshwater Teleosts," Micron, 31 (2000), Elsevier Science Ltd. (18 Pages).

Mueller, RP, et al., "Characterization of Gatewell Orifice Lithting at the Benneville Dam Second Powerhouse and Compendium of Research on Light Guidance With Juvenile Salmonids," US Army Corps of Engineers, Pacific Northwest National Laboratory Sep. 2008 (55 Pages).

Sandbakken, Mari, et al., "Isolation and Characterization of Melanopsin Photoreceptors of Atlantic Salmon (*Salmo salar*)," The Journal of Comparative Neurology 520 (2012) (18 Pages).

Villamizar, N., et al., "Effects of Light During Early Larval Development of Some Aquacultured Teleosts: A Review," Aquaculture 315 (2011), (9 Pages).

* cited by examiner

ARTIFICIAL LIGHTING SYSTEM FOR FISH AND A METHOD OF PROVIDING FISH LIGHTING

CROSS-REFERENCE TO PRIOR APPLICATIONS

This application is the U.S. National Phase application under 35 U.S.C. § 371 of International Application No. PCT/EP2014/076941, filed on Dec. 8, 2014, which claims the benefit of European Patent Application No. 13196390.2, filed on Dec. 10, 2013. These applications are hereby incorporated by reference herein.

FIELD OF THE INVENTION

The invention relates to lighting systems for fish, for example for cultivation in sea cages, or for use in other types of fish hatchery and fish farm.

BACKGROUND OF THE INVENTION

The behavior of fish or other aquatic animals in their natural environment depends on a number of factors such as temperature, light quality, oxygen concentration, water PH. The amount of fish or the density of fish in a certain area is also strongly determined by environmental factors in that area. Highly intensive fish cultivation takes place depending on the species and developmental stage in fresh water or in marine water. For example, currently the majority of Atlantic salmon production takes place in marine net cages or sea cages.

In water cages, such as marine net cages or sea cages and fresh water tanks, the lighting conditions can be influenced by using artificial light placed either above or in the water. There are multiple artificial lighting systems currently available for fish applications. They include light sources using fluorescent, incandescent or metal halide bulbs, or using light emitting diodes. The lighting is for example placed in a sea cage or above a fresh water tank. Generally, known systems have lights which are either on or off, without any dimming control.

The artificial light is for example specifically used for prevention of fish maturation in marine water applications and used for smoltification (behavioral) processes in fresh water applications.

Most of the artificial light used is white broad spectrum light and is used to extend the duration of the day, or blue light to specifically target the pineal gland of the fish.

LED lighting has multiple advantages with respect to conventional lighting such as metal halide and fluorescent lighting. LED light sources can have a narrow and well-defined spectral output, the light intensity can be varied over a broad range, and different LED light sources of different colors can be combined offering control of spectral output which allows appropriate spectrum and light intensity for different purposes.

U.S. Pat. No. 7,878,674 describes an LED lighting system applicable to hatcheries, aquariums and photo bioreactors that can deliver spatially and spectrally controlled light with optimal spectral output for growth.

The known systems are difficult to use and require significant knowledge and input from the user.

SUMMARY OF THE INVENTION

In view of the above it is desirable to provide an effective artificial lighting solution which is able to improve the yield and productivity of fish cultivation, and at the same time to provide an easy to use interface for the user.

The invention is defined by the claims.

According to an aspect of the invention, there is provided a fish lighting system, comprising:

a lighting arrangement;

an input interface for receiving instructions representing a desired fish behavioral and/or physiological response; and a conversion unit, for converting the received instructions into a lighting control signal for driving the lighting arrangement, wherein the lighting control signal is adapted to select the intensity and color of the output from the lighting arrangement to obtain the desired fish behavioral and/or physiological response.

This system provides a user interface which enables the user simply to specify a desired fish response. The system converts this desired response into a control signal for a lighting system, which controls both the intensity and color. The intensity and color may vary over time. The system can be programmed with additional information as new insights into the role lighting plays in fish development and behavior are uncovered. In this way, the system remains simple for the user to operate.

In one example the input interface is adapted to receive instructions in the form of a set of at least two coordinate values, wherein a first coordinate value represents a visual response, and a second coordinate value represents a biorhythm response.

In another example, the input interface is adapted to convert the instructions representing a desired fish behavioral and/or physiological response into a set of at least two coordinate values, wherein a first coordinate value represents a visual response, and a second coordinate value represents a biorhythm response.

In this way, the system interprets the desired response as visual and non-visual components. This set of components then can be used to define a standardized data format which can be used to express all the different behavioral and physiological responses of the fish. This then enables conversion to a lighting control system signal. In this way, different fish responses can be added to the possible inputs to the system without needing to change the underlying data processing. The coordinate values function as an intermediate data set.

The lighting units can then also be characterized in terms of this intermediate data set. Thus, the input instructions are provided or converted into an intermediate data set which represents the fish anatomical behavior, and the lighting units can also be characterized by the same data set. By providing this intermediate data set, new input instructions can be built into the system over time, and the lighting arrangement can be adapted over time. Thus, the system provides compatibility between the input instructions and the lighting arrangement, for different systems or for a system that can evolve over time.

For example, the first coordinate value can represent a visual response during daylight, and the set of at least two coordinate values can further comprises a third coordinate value which represents a visual response during the night. Thus, there are then at least two coordinates for visual response parameters and at least one coordinate for a non-visual response parameter The input interface can further be adapted to convert the desired fish behavioral and/or physiological response into a light intensity parameter. In this way, there is a set of coordinate values which can be used to determine a lighting color to be used, and a separate intensity parameter.

The lighting arrangement preferably comprises a plurality of LEDs, although other light sources can be used.

In addition to inputting the desired fish response, the system can further comprise a temperature sensor and/or an ambient light sensor. This enables the light recipe to be adjusted according to temperature and ambient lighting. This ambient lighting can for example be indicative of the time of day.

The invention also provides a method of providing fish lighting in the form of a light intensity distribution, comprising:

receiving instructions in representing a desired fish behavioral and/or physiological response; and converting the received instructions into a lighting control signal; and driving a lighting arrangement using the lighting control signal, wherein the lighting control signal is adapted to select the intensity and color of the output from the lighting arrangement to obtain the desired fish behavioral or physiological response.

As mentioned above, converting the received instructions can comprise an intermediate step of deriving a set of at least two coordinate values, wherein a first coordinate value represents a visual response, and a second coordinate value represents a biorhythm response. Alternatively, the system can receive these coordinate values as input.

Converting the received instructions into a lighting control signal can comprise:

characterizing each of a plurality of light sources using a set of at least two coordinate values, wherein a first coordinate value represents a visual response, and a second coordinate value represents a biorhythm response; and driving the light sources such that the combined lighting aims to match the set of at least two coordinate values of, or derived from, the received instructions.

In this way, the light sources are characterized by the same biological response characteristics as the derived from the input to the system. This provides a more effective control approach than additionally converting to light spectrum profiles.

The first coordinate value can represent a visual response during daylight, and the set of at least two coordinate values then can further comprise a third coordinate value which represents a visual response during the night. The desired fish behavioral and/or physiological response can also be converted into a light intensity parameter.

Preferably, deriving a set of at least two coordinate values can comprise:

setting a desired response of at least one visual photo pigment of the fish to the light intensity distribution to be provided; and setting a desired response of at least one non-visual photo pigment of the fish to the light intensity distribution.

In this way, the photo pigment cells in the fish are taken into account in defining the intermediate data set. For example, setting a desired response of at least one visual photo pigment of the fish to the light intensity distribution to be provided can comprise:

setting a desired response of a rod photo pigment;

setting a desired response of each of a set of red, green, blue and UV cone photo pigments.

Setting a desired response of at least one non-visual photo pigment of the fish to the light intensity distribution can comprise setting a desired response of each of first and second pineal gland photo pigments.

In each case, the desired response can comprise the integral over frequency of the product of the light intensity distribution to be provided and a normalized light absorption characteristic of the respective photo pigment, normalized with respect to the sum of the sensitivities.

The desired lighting can also take into account the temperature and/or the ambient lighting characteristics.

BRIEF DESCRIPTION OF THE DRAWINGS

An example of the invention will now be described in detail with reference to the accompanying drawings, in which.

DETAILED DESCRIPTION OF THE PREFERRED EMBODIMENTS

The invention provides a fish lighting system in which an input interface receives instructions in the form of a desired fish behavioral and/or physiological response. This is converted into a lighting control signal for driving a lighting arrangement, with the intensity and color of the output from the lighting arrangement varied over time to obtain the desired fish behavioral and/or physiological response.

Figure 1:
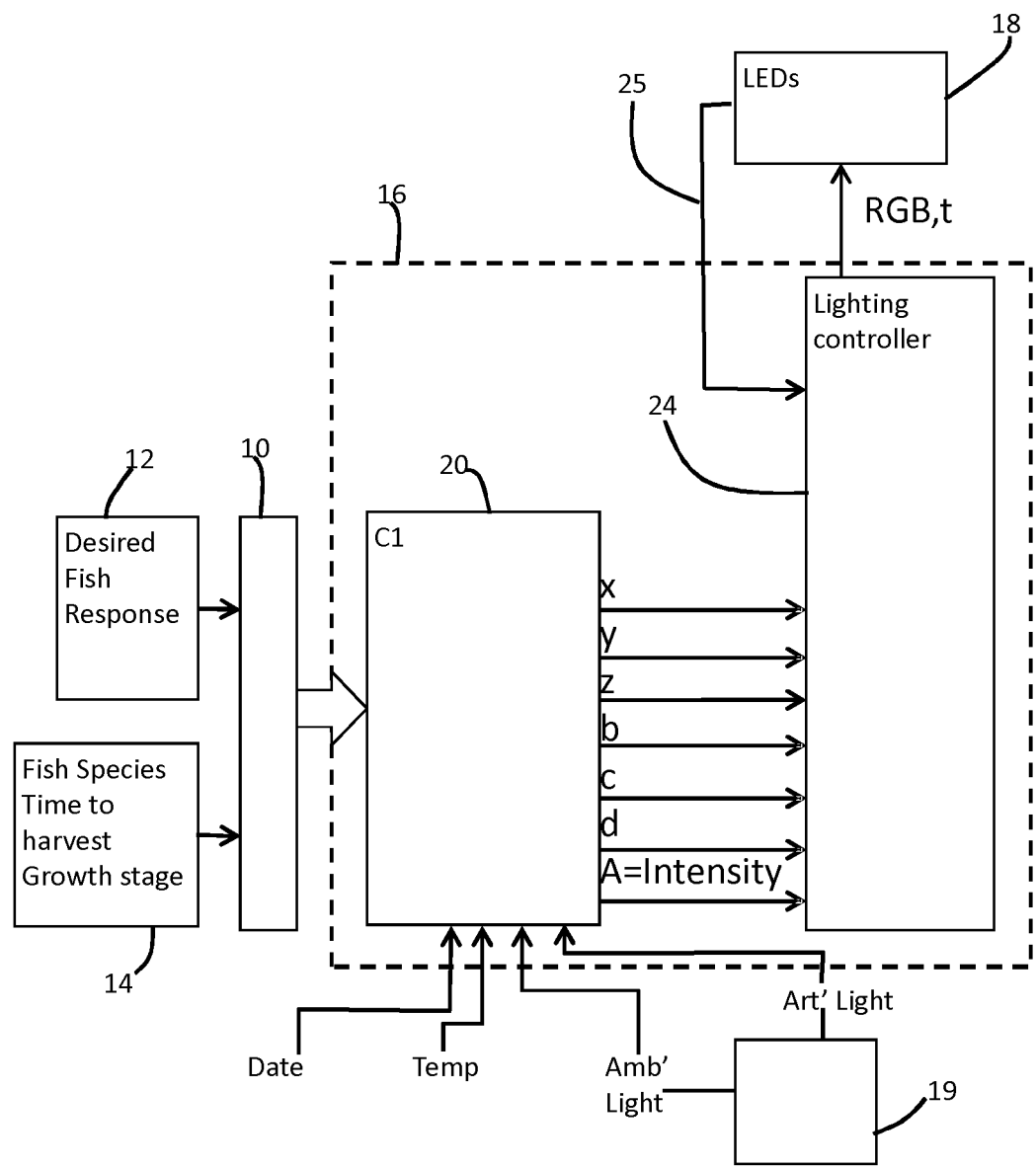
FIG. 1 shows a lighting system of the invention.

FIG. 1 shows an example of a fish lighting system of the invention.

The system comprises an input interface 10 for receiving instructions in the form of a desired fish behavioral and/or physiological response 12 and also specifying the type of fish 14. The time to harvest and growth stage of the fish can also be specified.

The response 12 can be a desired maturation rate of the fish, for example to prevent developing to maturity within a certain period of time. Thus, it may comprise a long term developmental response. It may instead comprise a short term response, such as to start a breeding cycle, or to feed.

Other desired fish responses can include improved feed conversion ratio, decreased mortality, increased growth, impact on fish color, etc.

These desired responses are supplied to the interface 10 which provides them to a conversion unit 16, for converting the received instructions into a lighting control signal RGB,t for driving a lighting arrangement 18.

The lighting arrangement 18 can comprise different lighting modules which can for example be placed at different depth within sea cages used for harvesting fish. The arrangement can comprise multiple modules to produce a more or less even distribution of light points. The illumination system can comprise immersed light sources which can be distributed evenly over the whole volume of a sea cage, for example. Alternatively, the light sources may be mounted above the water surface. Any suitable light sources can be used. One example is LED light sources.

Light sensors 19 can either provide the overall light levels, or they may separately measure the ambient light level and the artificial light being provided by the system (as shown in FIG. 1). A light sensor for detecting ambient light can be arranged above a surface of the body of water, to provide ambient light data. Ambient light is thus considered to be the light sensed above the water surface.

In one example, the conversion unit 16 has a first conversion unit 20 (C1) to convert the received instruction to a standardized format. This can be considered to be an intermediate data format. This comprises the variables shown in FIG. 1 as w, x, y, z, b, c, d, Intensity. These parameters are discussed below. However, this conversion is not essential, in that the user can specify the desired fish response based on this set of variables. The input to the system is thus generally instructions representing a desired fish behavioral and/or physiological response. These instructions can be in the form of desired outcomes ("do not mature for 6 months") which then need conversion to the variable values w, x, y, z, b, c, d, Intensity. Alternatively, the instructions can be in the form of that variable set.

For example, the biologist or fish growers making use of the system will find out how best to grow the fish they are farming. This will result in a description of temperatures, nutrition schemes and light recipes. A current light recipe is an instruction to switch on or off a lamp of a certain type during a certain period. The system of the invention instead defines the spectral composition of the lamp can now be defined by using the variables x, y, z, b, c, d and Intensity (A) which represents the absolute light level. Thus, the farmer or biologist can supply these variables as input to the lighting system.

If used, the first conversion unit 20 comprises a processor and memory, which can be updated with new possible fish responses and fish species over time. Thus, as new understanding is obtained, the system can be upgraded in a simple manner. However, the fish response is always converted into the standardized format, so that the subsequent conversion into light control signals can use the same process. The first conversion unit can for example implement a look up table to convert from desired fish responses to the intermediate data set.

In one example, the conversion into the standardized format can also take into account the date (which gives information about the season, and day length), the temperature, oxygen level (mainly in case of hatcheries) and the ambient light levels, as shown in FIG. 1. The standardized format can be static and remain in place while the instructions are being executed, or else it may provide a dynamic evolution of the parameters over time. This evolution can depend on the type of fish, but also the growth stage, desired moment to move the fish from fresh water to sea water and desired time to harvest.

The resulting standardized data set thus signifies a desired lighting condition, but expressed in terms which relate to the anatomy of the fish (as explained below). The data is provided to a lighting controller 24 which generates the RGB control signals to the lighting arrangement 18. There is feedback 25 from the LED lighting arrangement to the lighting controller 24, as shown, so that the lighting controller can take account of the actual possible output gamut of the lighting arrangement, and then derive the closest possible actual light output to the desired light output. Furthermore, the feedback 25 enables the light output characteristics of the individual light modules to be expressed in terms of the same parameters x, y, z, b, c, d, A.

The light control signal to the lighting arrangement 18 includes a time parameter, and the lighting control signal can be adapted to vary the intensity and color of the output from the lighting arrangement over time to obtain the desired fish behavioral and/or physiological response.

The parameters x, y, z, b, c, d, can for example be encoded with 1 or 2 bytes per parameter. The lighting controller 24 communicates with the lighting system 18 using the same parameters.

For each lamp of this lighting system 18 the color point (or color area) and absolute light level is known by the lighting controller 24. The values can be preprogrammed into the lighting controller 24 or can be retrieved from the lamps of the lighting system by bi-directional communication. The lighting system can comprise full color controllable LED lighting or else conventional fixed or dimmable lamps.

The color points can be received in the (x, y, z, b, c, d), A color space or converted into a value in the (x, y, z, b, c, d), A color space so that the lighting system can be controlled using this color space.

The lighting controller 24 creates the color point and light level closest to the light recipe by controlling the individual lamps. The color controllable lamps receive the desired color point and independently calculate the optimum set point. The optimum could be based on energy efficiency of the lamp, or balancing the load across the different lamps (note that the same color point can be reached in more than one way due to isomerism).

Just like humans, fish have a specific sensitivity for light in terms of intensity and wavelengths. The fish sensitivity to light changes according to the species and to the developmental status. Therefore fish require different light intensities and wavelengths during their development in order to support their development, maximize sea water adaptation, etc.

Moreover, within the same developmental stage, a fish is influenced by different environmental parameters such as: day length (photoperiodic activity) and season, water temperature, oxygen level in the water, etc. Depending on the time within the season, and the time of day, a fish has a different feeding pattern and behavior. However, fish do not behave only in response to light; other environmental factors such as temperature play also an important role.

In known systems, the lighting does not create close to the exact lighting conditions (both in intensity and in color) to support and maximize specific developmental phases of the fish.

The invention enables lighting recipes to be provided to the fish, whilst avoiding the need to manage complex communications between different types of lighting device, light control devices, light sensors, temperature sensors, etc.

The invention simplifies the system for the user by providing an input in the form of instructions representing desired fish behavioral and/or physiological response. This desired response is presented as, or converted into, a standard set of fish response parameters, which can be thought of as a "fish action space". This is the set of intermediate parameters in FIG. 1.

It enables the light recipe control and implementation to be made easier, and allows the control to become less dependent on the technical construction of the lighting devices and the other components.

By defining the "fish action space", only the correct coordinates need to be calculated and generated. The same coordinates may be used by different lighting devices and using different spectra. In this way, the most efficient way to generate a required and/or desired lighting condition can be used. This may be either on energy efficiency, on cost efficiency, and even based upon ergonomic requirements. The "fish action space" thus relates to parameters which can be used to predict the response of the fish to light and define light recipes for different fish species at different stages of development.

The light spectrum of the lighting devices can be controlled by communicating the desired light color and intensity without detailed knowledge of the exact light spectrum of the lamps involved. The light sensors 19 can for example be used to measure the resulting spectrum to implement a feedback control. Thus, the LED controller may use optical feedback instead of the data feedback 25 shown in FIG. 1.

A feature of the "fish action space" is that the spectral composition of light that is offered to the fish can be expressed in units relevant to the fish physiology, derived from physiological absorption and response/action characteristics. The system enables simplified communication between fish cultivators, fish physiologists and biologists, and lamp manufactures.

The desired fish behavioral and/or physiological response can be used:

(i) In order to achieve a specific goal (e.g. shorter growth cycle, stress-free fish, increased fish and aquaculture quality, decreased aggressiveness) by using different types of lamps with different spectral composition. The implementation allows the control to become less dependent on the technical construction of the lighting devices and the other components.

(ii) In order to predict the response of the fish to light in order to define light recipes for other fish species or other developmental stages of same fish type.

(iii) In order to provide dynamic spectral control for growth light. Light sensors can be used to measure the light spectrum and can use the coordinates to define the spectral composition of artificial light based on ambient daylight composition. The control systems may be able to control the light spectrum of lighting devices by communicating the correct coordinates without detailed knowledge of the exact light spectrum of the lamps involved. Light sensors can measure the resulting spectrum and may be able to communicate the results.

In order to derive the set of intermediate parameters, and thereby define the "fish action space", the specific behavioral responses relating to fish can be described. These responses follow from the fish anatomy, in particular the light responsive cells of the fish, such as different photoreceptors.

For a given light intensity distribution, there will be a particular level of detection by a given photoreceptor, and this detection will then give rise to a corresponding fish biological response.

Fish, like other vertebrates, have two categories of photoreceptor centers:

(i) ocular photoreceptors that are mainly linked to visual perception (ii) pineal, parapineal, deep brain and other photoreceptors that are involved in non-visual photoreception leading to biological changes or biorhythm changes.

Part of the ocular photoreceptors might be used in order to see food, light direction, predators. It is known that pineal and deep-brain photoreceptors are involved in signaling of e.g. photoperiodic information. Pineal photoreceptors make the hormone melatonin. Melatonin production is confined to the dark portion of a light-dark (LD) cycle and provides a chemical signal that plays an important role in the regulation of circadian and/or photoperiodic behaviors.

Melanopsin photoreceptors can be involved in signaling of photoperiodic information through multiple pathways, involving both the retina and possibly deep-brain photoreceptors directly transmitting photoperiodic information to the hypothalamus-pituitary axis.

The set of intermediate parameters shown in FIG. 1, which function as a "fish action space", represent the combination of these different effects.

By making use of this set of parameters, the invention provides a new way of controlling artificial lighting to stimulate fish growth, development, and welfare.

The set of parameters of the "fish action space" allows communication regarding lighting conditions that is as much as possible independent of the exact spectral properties of the lighting devices that are used in the application installation. The invention can be used for most fish (both fresh water and sea water).

The example of system shown is able to provide the exact content of a variable light distribution (i.e. intensity and spectrum) as a function of the time of the day, light intensity and light distribution of natural light or other light than the artificial light being provided, fish species, fish growth stage, and the time to harvest.

The "fish action space" takes account of a number of different fish responses to light:

(i) A visual response relates to the visual perception of light direction, food, predators. The photo pigments used for these visual processes are mainly grouped in the UV band of 350-400 nm (peak at 380 nm), blue band of 410-470 nm (peak at 435 nm), the green band of 470-550 nm (peak at 530 nm), and the orange-red band of 550-650 nm (peak at 580 nm). They are linked to the so-called A1 system (rhodopsin), and the so-called A2 system (porphyropsin).

However, the A1/A2 ratios vary with retinal position, water temperature, day length, migration habits, hormonal composition, etc. The proportion of the pigments is not the same for all species, and, in addition, it may not remain constant throughout the seasons, or with age.

The visual response is also split between a daylight visual response determined by cone photo pigments, and which is referred to below in connection with integral A, and night visual response which is determined by rod photo pigments, and which is referred to below in connection with integral B.

FIG. 2(a) shows the rod photo pigment spectral sensitivity to the visual light spectrum, and FIG. 2(b) shows the cone photo pigment spectral sensitivity for the four different cell types to the visual light spectrum. The spectral sensitivity of the cones can differ per species.

Figure 2:
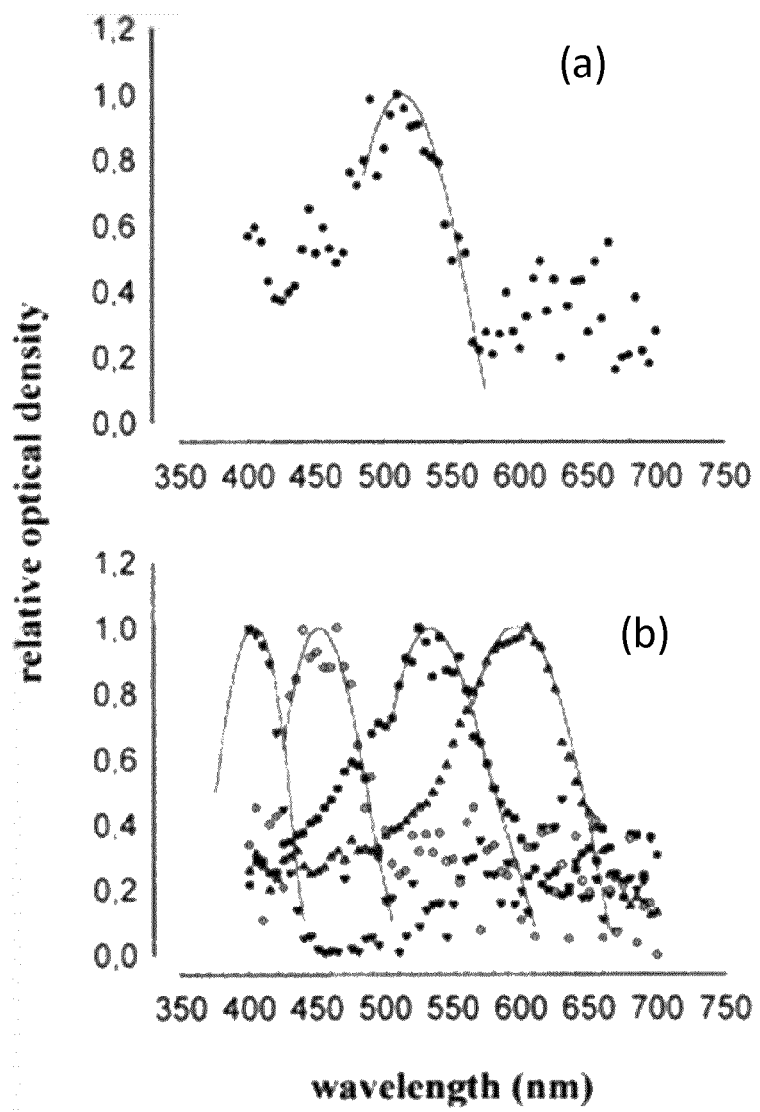
FIG. 2 shows an example of the relative optical density of the rod photo pigment and cone photo pigments for trout.

In FIG. 2, the raw absorption data is represented by symbols and the fitting equations are represented by lines.

(ii) A non-visual, biorhythm response is involved in non-visual photoreception, for example but not limited to the regulation of circadian and/or photoperiodic behaviors. It is beneficial to detect the chromatic transitions occurring just before and during sunrise and at twilight, which provide information relating to start or stop signals for neuroendocrine activity of the pineal organ which in fact determines the regulation for the circadian rhythm.

There are two pineal photo pigments, the first having an absorption peak at 463 nm, while the second has the absorption peak at 561 nm.

Figure 3:
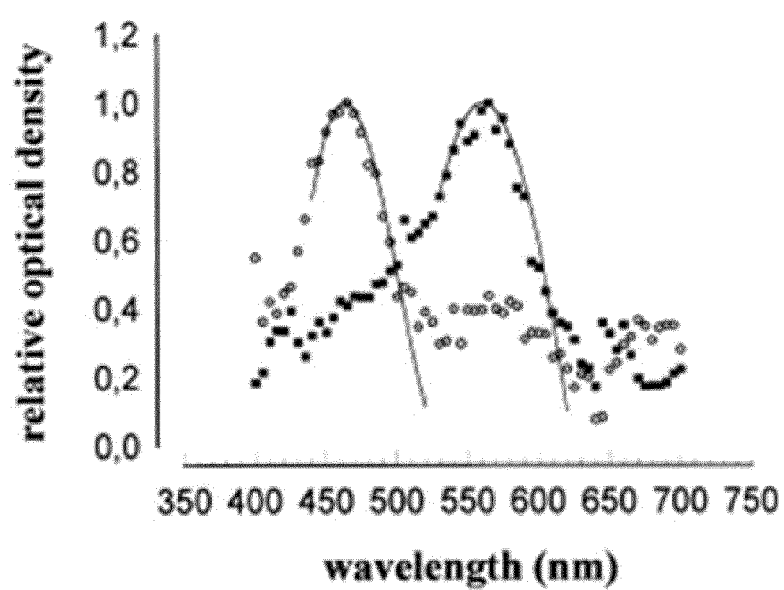
FIG. 3 shows an example of the relative optical density of the pineal photoreceptors.

FIG. 3 shows the relative optical density of the pineal photoreceptors. Each curve has been normalized to its own maximum optical density.

Besides these pineal photoreceptors there are other photoreceptors regulating the biorhythm such as melanopsin that is found both in eye and deep-brain and parapineal photoreceptors. Moreover, there are other photoreceptors that will contribute to regulating the biorhythm or other biological processes.

The system described below does not take into account these further characteristics, but the system of the invention described can be expanded to cover additional responses.

The example of the system of the invention described in detail in this application makes use of at least 3 dimensions, relating to visual daylight, visual night and pineal actions. Together, these responses allow a description of lighting conditions in different situations. In this way, the coordinates used to define the "fish action space" represent at least an amount of visual action and an amount of pineal action.

Each action coordinate can be derived by calculating, for each wavelength of an incident light spectrum, the relative sensitivity of the particular photoreceptor, and summing those relative amounts over all relevant wavelengths.

In this way, all contributions to the specific action are combined for all relevant wavelengths of light. The intensity of the light at different wavelengths gives rise to a weighted contribution.

An example of the "fish action space" based on these principles will now be presented.

A first parameter W represents the response of the UV cone photo pigments. As explained above, for a particular light intensity distribution $I(\lambda)$, the sensitivity of that photo pigment $UV(\lambda)$ at a given wavelength is multiplied by the light intensity at that wavelength, and this multiple is summed over the visible light spectrum, 300 nm to 800 nm:

$$W(UV) = \int_{300\,nm}^{800\,nm} I(\lambda)UV(\lambda)d\lambda$$

A second parameter X represents the response of the Red cone photo pigments.

$$X(Red) = \int_{300\,nm}^{800\,nm} I(\lambda)Red(\lambda)d\lambda$$

A third parameter Y represents the response of the Green cone photo pigments.

$$Y(Green) = \int_{300\,nm}^{800\,nm} I(\lambda)Green(\lambda)d\lambda$$

A fourth parameter Z represents the response of the Blue cone photo pigments.

$$Z(Blue) = \int_{300\,nm}^{800\,nm} I(\lambda)Blue(\lambda)d\lambda$$

An overall visual response can be defined as:

$$A(Visual\ daylight) = \int_{300\,nm}^{800\,nm} I(\lambda)(UV(\lambda)+Blue(\lambda)+Green(\lambda)+Red(\lambda))d\lambda$$

$$A(Visual\ daylight) = W+X+Y+Z$$

This overall response can be used to normalize the other values, by defining:

$$w = \frac{W}{A}$$
$$x = \frac{X}{A}$$
$$y = \frac{Y}{A}$$
$$z = \frac{Y}{A}$$

Note that the color point is determined by using only 3 dimensions.

(x, y, z) because the fourth coordinate can be derived from the combination of the other three:

$$w = \frac{W}{A} = \frac{A-X-Y-Z}{A} = 1-x-y-z$$

In this way, the color point (x, y, z) together with A for the absolute light intensity is sufficient to describe the daylight response of the receptors in the eyes of the fish. Of course any other combination of three of x, y, z and w together with A can be used.

The cone photoreceptors often contain oil droplets with a pigment to absorb part of the spectrum, so that the overlap between the absorption spectra is reduced and minimal color differences can be detected. The compensation can be done by compensating using the absorption spectrum of the involved pigment:

For example, for the blue photo pigment:

$$Z(Blue) = \int_{300\,nm}^{800\,nm} I(\lambda)Blue(\lambda)Abs(\lambda)d\lambda$$

This provides a modification to the photo pigment sensitivity function $Blue(\lambda)$ to take account of an absorbing layer. The same modification if needed can be applied to the other function.

For the visual nightlight, which corresponds to the rod photo pigment sensitivity, the following function is defined:

$$B(Visual\ nightlight) = \int_{300\,nm}^{800\,nm} I(\lambda)\ Visualnight(\lambda)d\lambda$$

A similar approach applies to the biorhythm regulated by the pineal gland, at the two peak optical densities:

$$C = \int_{300\,nm}^{700\,nm} I(\lambda)Biorhythm450(\lambda)d\lambda$$

$$D = \int_{300\,nm}^{700\,nm} I(\lambda)Biorhythm575(\lambda)d\lambda$$

In these equations, A(Visual daylight) is expressed as function of W, X, Y, Z coordinates, which is the same as in the case of human vision. $I(\lambda)$ is defined in Watts. In this example, the biorhythm-related parameters contain only the pineal expression, and can be extended in the future to parapineal and melanopsin expression.

All responses can be related to the daylight response A to provide a normalization function. This is possible because the daylight spectrum has overlap with all other spectral responses:

$$b = \frac{B}{A}$$
$$c = \frac{C}{A}$$
$$d = \frac{D}{A}$$

This means that the intermediate coordinate system can comprise six dimensions (b, c, d, x, y, z) relating to the visual color value and the value A relating to the overall light intensity. As explained above, the value W is derivable from the values A, x, y, z (since A=W+X+Y+Z, so that W=A(1−x−y−z)).

Thus, all of the parameters (B,C,D,W,X,Y,Z) can be depicted in a six dimensional relative color space for fish.

By using this representation the values (x, y, z) explain the color perception of fish and the (b, c, d) coordinates express subconscious behavior, in the case that b is also correlated to subconscious perception.

The light level is expressed in the A value. Note that below a certain A value the (x, y, z) values have no significance.

As shown in FIG. 1, the intermediate coordinate system comprises these values (x, y, z, b, c, d, A).

In one example the illumination system 18 contains LEDs covering the whole visible range from 380 nm to 700 nm.

The light intensity range is determined by the light sensitivity of the species. For example, salmon has a peak sensitivity to blue and green wavelengths within the range of 450-550 nm and the photoperiod is determined by the whole fish visible spectrum. The minimum light intensity level required for salmon is 0.016 W/m$^2$ at fish/pineal gland level.

As shown in FIG. 1, the intermediate parameter set is used by the lighting controller 24.

In the parameters x, y, z, a, b, c all values are normalized to 1. These values are used to define the spectral composition of the lighting system.

By using parameters based on the spectral response curves of fish (instead of based on spectral functions), the light recipes relevant for fish growth can be defined. Isomerism (light sources with different spectra but the same fish response characteristics) will have the same color point when defined using this parameter set. The responses are species-dependent but the fish action space nevertheless provides a suitable general way of defining the desired lamp spectral characteristics.

The fish action space enables marine biologists and fish growers to describe light recipes for fish growth in terms of the fish response rather than in terms of light spectrum.

As explained above, the color space is a 7-dimensional space which can be represented by six dimensions (x, y, z, b, c, d) and A for total light levels. As six dimensions are difficult to represent, the daylight vision can be represented separately by a 4-dimensional color space (x, y, z)+A, and the total response (in which the day vision is represented as one value) is represented as (b, c, d)+A.

In this way, two 3-dimensional color spaces are correlated by the total light level A.

As a result of the normalization, each value (x, y, z, b, c, d) has a value between 0 and 1.

To derive the required lighting control signals, each individual controllable lamp is represented as a single color point with the coordinate space (x, y, z, b, c, d), A. Two light sources (e.g. LEDs) will have two color points.

If these two color points $(x_1, y_1, z_1, b_1, c_1, d_1) A_1$ and $(x_2, y_2, z_2, b_2, c_2, d_2) A_2$ A line between these color points can be used to define the new color point of the combined two light sources:

$$(x_{1+2}, y_{1+2}, z_{1+2}, b_{1+2}, c_{1+2}, d_{1+2})$$

$$=>x_{1+2}=((A_1)/(A_1+A_2))x_1+((A_2)/(A_1+A_2))x_2$$

$$=>y_{1+2}=((A_1)/(A_1+A_2))y_1+((A_2)/(A_1+A_2))y_2$$

etc.

For multiple light sources the calculations are the same:

$$=>x_{1|2|3}=((A_1)/(A_1+A_2+A_3))x_1+((A_2)/(A_1+A_2+A_3))x_2+((A_3)/(A_1+A_2+A_3))x_3$$

The total light level is the summation:

$$A_{1+2}=A_1+A_2$$

$$A_{1+2+3}=A_1+A_2+A_3$$

In the controllable lighting system, these A values can be controlled (dimmed) A full output would give A1 for light source 1 and at dim level of 50% the light output would be 0.5*A1.

The lighting driver thus essentially defines a combination of control signals to the individual light sources so that the summations of their light output characteristics give rise to the desired data set (x, y, z, b, c, d), A.

There is a large overlap in the spectral response spectra for the different photo pigments, it will not be possible to realize a specific color point exactly. In particular, the parameters (a,b,c,x,y,z) are not independent. For example, a light source with color point (1,0,0,0,0,0), does not exist.

In the daylight vision system, the overlap is smallest, so to make any color a fish can distinguish visually, there is simply a need for 4 colors: (UV, Blue, Green, Red). This is equivalent to the color space for the human eye, which requires 3 colors to make most colors humans can distinguish (in a 2D horseshoe arrangement). The equivalent for fist will require four light sources. However, using single colored light sources to make white light gives rise to poor color rendering. Using broad spectrum light sources will give less control on the color point but better ability to create a broad spectrum. There is thus a trade-off in the selection of the light sources.

For the fish color vision, a similar horse shoe shape exists but in a 3D color space.

The night vision and pineal responses will lay within the visual color space for fish but are different in peak and spectral width. Also threshold values will be different. Thus, not only the color point but also the light levels play a role in the actual response and will be part of the light recipe.

For the other responses the color space will be a complex shape with folded surfaces intersecting and overlapping one another. This also means that totally different colored light could yield the same effect non conscious behavior of fish.

For this reason, the approach of the invention in defining light in parameters related to the different photoreceptor responses provides an optimum parameter set to enable flexibility and ease of implementation in controlling the light sources.

The more different color light sources that are used, the more control there will be of the color point. As a minimum, the system needs at least need two light sources that have a different color point in fish color action space (i.e. when characterized by the values x, y, z, b, c, d). At least one of the light sources should be able to dim in order to reach a color set point on the line between the two color points in the fish color action space.

As explained above, the system can receive instructions in the form of a desired fish behavioral and/or physiological fish response and convert this to the "fish action space" parameters, or else the "fish action space" values can be input into the system. In a simplest implementation, the "fish action space" can include a desired visual response (as a first parameter), and a desired biorhythm response (as a second parameter). The lighting system interface part receives a set of light settings that can be applied by a given lighting system. Within the "fish action space", light settings are represented by the first and second parameters and also a light intensity parameter.

The lighting system is then controlled by adjusting the power of each lamp that has adjustable intensity and/or spectrum. In a preferred implementation, the "fish action space" comprises at least three coordinate values (a first coordinate value representative for visual daylight in a first dimension, a second coordinate value representative for visual nightlight in a second dimension, and a third coordinate representative for biorhythm action in a third dimension). A light intensity parameter is derived from the total optical power associated with wanted fish response.

Some examples of the type of lighting control that may be desired will now be discussed.

One aim of the fish farmer can be to improve fish development by improving growth by better feed intake and improving feed conversion rate (FCR). This can be achieved by targeting both the visual, pineal gland and deep brain photoreceptors of the fish as explained above. By combining sensitivity of all these photoreceptors the appropriate fish color is defined in the range of 420 nm to 650 nm. It is also important that fish can see the food and contrast is also relevant that the light has influence on the metabolism and biorhythm of the fish.

Thus, one resulting desired light output can have at least 50% of the spectrum between 420 nm and 650 nm. This color can be provided by using combination of blue, white and green LEDs.

Figure 4:
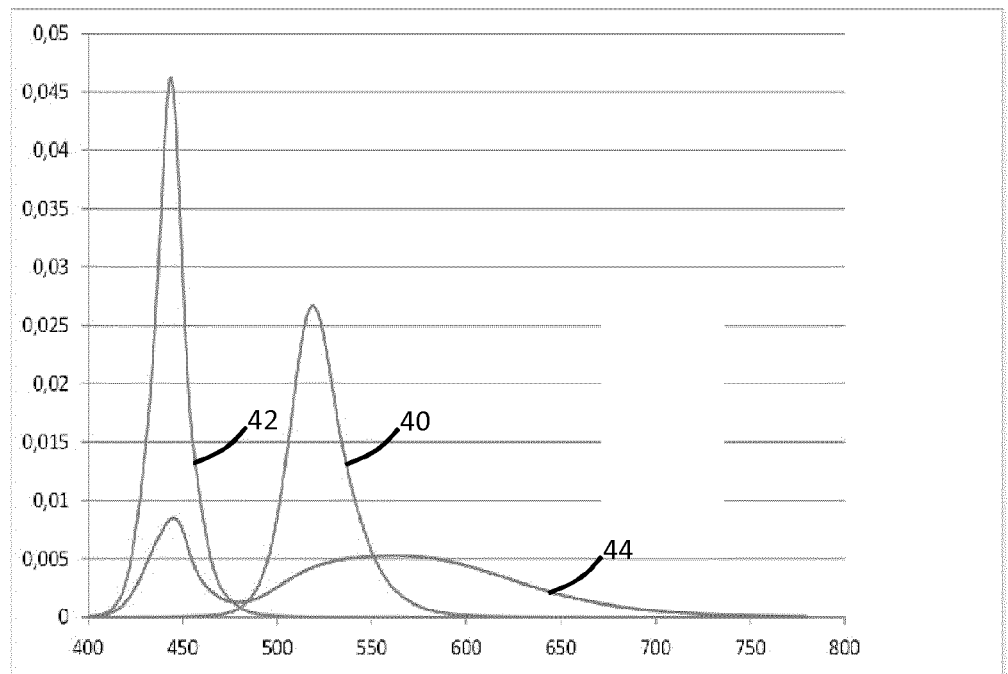
FIG. 4 shows how a light spectrum over a desired wavelength range can be created.

FIG. 4 is an example of how this can be provided, and shows the light spectrum 40 for a green LED, the spectrum 42 for a blue LED, and the resulting spectrum 44 when these are combined with a broad white spectrum.

LEDs can be used with direct light conversion using phosphors. Examples of phosphor which can be used are Ga-doped YAG, LuAG, LuGaAG, SSONe, β-SiAlON, BOSE/OSE.

Figure 5:
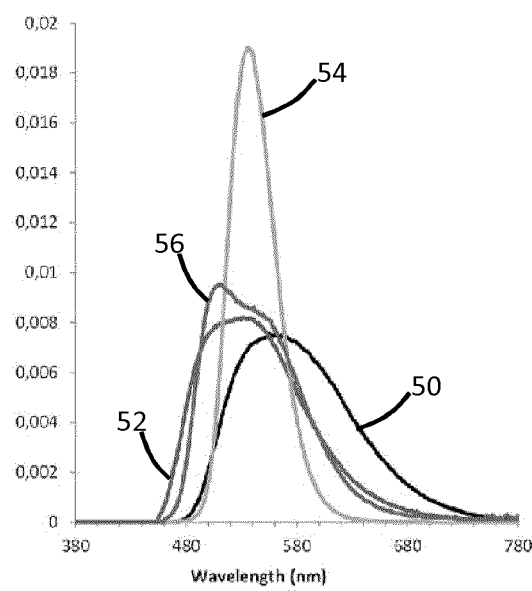
FIG. 5 shows how different phosphors can be used to give different frequency characteristics.

An example of the emission spectra of some examples of the phosphors that can be used independently or in combination is presented in FIG. 5. Plot 50 is the Nemoto YAG370A120 phosphor (a Gallium doped garnet: $(Ga_xY_{1-x})_3AL_5O_{12}$: Ce), plot 52 is a LuGaAG phosphor (a gallium doped LuAG: $(Ga_xLu_{1-x})_3Al_5O_{12}$:Ce), plot 54 is a $SrGa_2S_4$:Eu phosphor (a thiogallate), and plot 56 is a LuAG lumiramic phosphor (a ceramic LuAG).

Alternatively, a remote phosphor conversion layer can be used in combination with a blue LED to provide the required spectrum of 420 nm to 650 nm.

The remote phosphor used can be of the types shown in FIG. 5.

Figure 6:
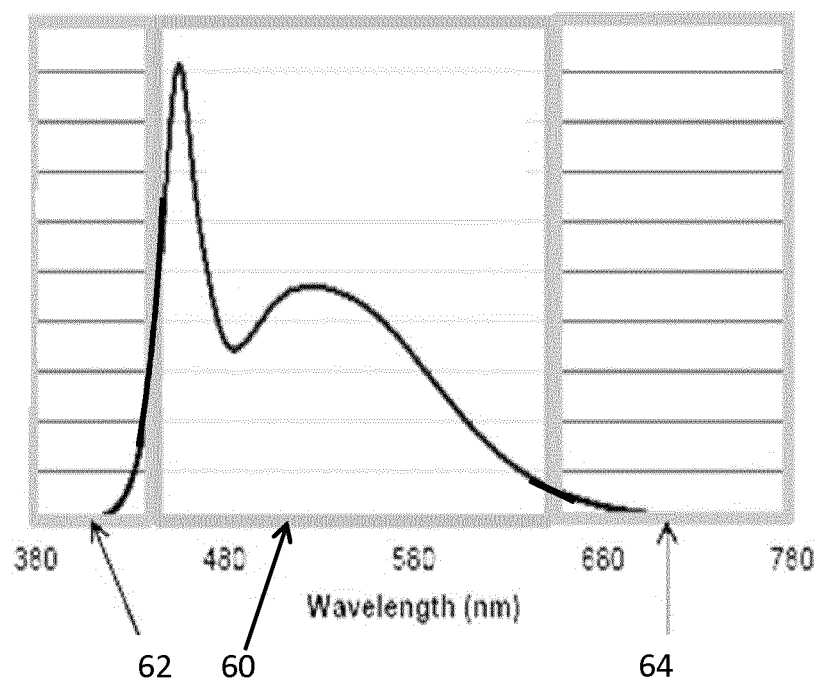
FIG. 6 shows how one phosphor conversion layer can be used with a blue LED to create a light spectrum over a desired wavelength range.

An example of the color provided using the using GaYAG phosphor from Nemoto (type 370A120) is indicated in FIG. 6. The phosphor combination has been adapted such to target the fish visual spectrum and to reduce the light loses due to water absorption.

In FIG. 6, the light 60 relevant to fish is in the band 420-650 nm. Shorter wavelength region 62 experiences strong water absorption and longer wavelength region 64 has no eye or pineal gland sensitivity.

In some situations, for salmon as well as for other species of fish, other phosphors can be used such as SAE (Strontium Aluminate Europium) with deep blue/near UV emission. For example when the salmon is in the fresh water stages of alevin, fry and parr, they perceive deep blue and UV light.

As mentioned above, one use of the light control is to inhibit sexual maturation. It has been found that the light intensity must be above 0.012-0.016 W/m² for this purpose.

The invention is of principal interest for aquaculture (fish growth) using an adaptive light control approach. The invention is of interest for fresh and sea water aquaculture, for example including fish, mollusks, shrimps, etc.

The input interface calculates a set of parameters representing a fish action by processing the specific desired fish response, such as developmental needs or behavioral response, which are correlated to both visual and non-visual light.

The system of FIG. 1 performs date processing function. For this purpose, a controller can be used. Components that may be employed for the controller include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

The lighting arrangement preferably comprises LEDs. However, more generally, any lighting devices can be used that can be adaptable in intensity, in emission spectrum, or both.

When LEDs are used, they can be solid state LEDs, but may optionally also be organic LEDs. Also combinations of solid state and organic LEDs may be applied. The term "LED" may also relate to a plurality of LEDs. Hence, at a single LED position, a plurality of LEDs may be arranged, such as a LED package of 2 or more LEDs.

The main advantages of using LEDs result from the possibility to control the spectral composition of the light to closely match the desired spectrum. It also promises a reduced energy consumption and associated cost.

Because they are solid-state devices, solid state LEDs are easily integrated into digital control systems, facilitating complex lighting programs.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A fish lighting system, comprising:
a lighting arrangement;
an input interface configured to receive instructions representing a desired fish behavioral and/or physiological response, wherein the input interface is configured: to receive the instructions as a set of at least two coordinate values comprising a first coordinate value and a second coordinate value; or to convert the instructions into said set of at least two coordinate values; and
a processor configured to convert the at least two coordinate values into a lighting control signal for driving the lighting arrangement, wherein the first coordinate value is defined in terms of a visual response, and the second coordinate value is defined in terms of a response of a non-visual photoreceptor;
wherein the lighting control signal is configured to select an intensity and color of output from the lighting arrangement to obtain the desired fish behavioral and/or physiological response.

2. A system as claimed in claim 1, wherein the visual response is a visual response during daylight, and the set of at least two coordinate values further comprises a third coordinate value which is defined in terms of a visual response at night.

3. A system as claimed in claim 2, wherein the input interface is further configured to:
   receive a light intensity parameter that is processed by the processor to determine the lighting control signal; or
   convert the instructions into the light intensity parameter.

4. A system as claimed in claim 1, wherein the lighting arrangement comprises a plurality of LEDs.

5. A system as claimed in claim 1, further comprising:
   a temperature sensor and/or
   an ambient light sensor.

6. A system as claimed in claim 1, wherein the non-visual photoreceptor is a pineal photoreceptor, a parapineal photoreceptor, a deep brain photoreceptor or a melanopsin photoreceptor.

* * * * *